US006688536B2

(12) United States Patent
Coldren et al.

(10) Patent No.: US 6,688,536 B2
(45) Date of Patent: Feb. 10, 2004

(54) FREE FLOATING PLUNGER AND FUEL INJECTOR USING SAME

(75) Inventors: Dana Coldren, Fairbury, IL (US); James J. Streicher, Pontiac, IL (US); Matthew Bredesen, Chicago, IL (US)

(73) Assignee: Caterpillar Inc, Peoria, IL (US)

( * ) Notice: Subject to any disclaimer, the term of this patent is extended or adjusted under 35 U.S.C. 154(b) by 119 days.

(21) Appl. No.: 09/828,253

(22) Filed: Apr. 6, 2001

(65) Prior Publication Data

US 2001/0015383 A1 Aug. 23, 2001

(51) Int. Cl.$^7$ ........................ F02M 47/02; F02M 45/10; F16K 31/44; F16K 31/02

(52) U.S. Cl. ............................ 239/92; 239/88; 239/91; 239/95; 251/77; 251/129.19

(58) Field of Search ............................ 239/88, 91, 92, 239/95, 533.2, 533.9, 533.7, 585.1–585.5, 569, 570, 124, 90, 89; 251/77, 129.19; 123/467, 470

(56) References Cited

U.S. PATENT DOCUMENTS

| | | | | |
|---|---|---|---|---|
| 2,964,027 A | | 12/1960 | Dadd | |
| 3,982,693 A | | 9/1976 | Hulsing | |
| 4,402,456 A | | 9/1983 | Schneider | |
| 4,463,725 A | | 8/1984 | Laufer et al. | |
| 4,467,963 A | * | 8/1984 | Sisson et al. | 239/90 |
| 4,482,094 A | | 11/1984 | Knape | |
| 4,494,696 A | * | 1/1985 | Schneider | 239/90 |
| 4,505,243 A | | 3/1985 | Miwa | |
| 4,531,672 A | | 7/1985 | Smith | |
| 4,538,576 A | * | 9/1985 | Schneider | 123/446 |
| 4,782,807 A | * | 11/1988 | Takahashi | 123/506 |
| 5,011,079 A | * | 4/1991 | Perr | 239/95 |
| 5,082,180 A | | 1/1992 | Kubo et al. | |
| 5,094,215 A | * | 3/1992 | Gustafson | 123/500 |
| 5,102,047 A | | 4/1992 | Rossignol | |
| 5,402,764 A | * | 4/1995 | Rossignol et al. | 123/508 |
| 5,409,165 A | | 4/1995 | Carroll, III et al. | |
| 5,533,672 A | * | 7/1996 | Peters | 239/88 |
| 5,636,615 A | * | 6/1997 | Shorey et al. | 123/506 |
| 5,704,319 A | | 1/1998 | Engelhardt et al. | |
| 5,860,398 A | | 1/1999 | Koerner | |
| 5,899,383 A | * | 5/1999 | Hickey et al. | 239/88 |
| 6,029,902 A | | 2/2000 | Hickey et al. | |

FOREIGN PATENT DOCUMENTS

| | | |
|---|---|---|
| EP | 0683314 | 11/1995 |
| EP | 0805270 | 11/1997 |

* cited by examiner

*Primary Examiner*—Gene Mancene
*Assistant Examiner*—Darren Gorman
(74) *Attorney, Agent, or Firm*—Liell & McNeil

(57) ABSTRACT

The present invention relates to fuel injectors having a free floating plunger. Traditional tappet assemblies include a plunger that is mechanically coupled to the tappet, and therefore, cannot be uncoupled over a portion of its movement during an injection event. In the event of a plunger seizure in a traditional tappet assembly, the tappet spring can be prevented from expanding, which can cause major valve train and engine damage. In addition, because the plunger in traditional tappet assemblies is moved to its upward position under the action of the tappet spring, the fuel passages can depressurize if fuel cannot refill the fuel pressurization chamber as quickly as the plunger retracts, causing cavitation bubbles. Therefore, the present invention utilizes a plunger that is not mechanically coupled to the tappet and can uncouple from the tappet during the injection event to address these and other problems related to plunger wear and failure.

13 Claims, 4 Drawing Sheets

FREE FLOATING PLUNGER AND FUEL INJECTOR USING SAME

TECHNICAL FIELD

This invention relates generally to fluid pumping, and more particularly to fuel injectors that include a free floating plunger that can be uncoupled from the tappet over a portion of its movement.

BACKGROUND

Conventional mechanically actuated fuel injectors include a tappet assembly having a plunger and tappet that are mechanically coupled to one another. One example of such a tappet assembly is taught in U.S. Pat. No. 4,531,672, issued to Smith on Jul. 30, 1985. Smith teaches a tappet and plunger that are mechanically coupled by a spring, thus allowing the plunger to retract with the tappet under the action of a tappet spring at the end of an injection event. While performance of tappet assemblies has been acceptable, problems associated with plunger scuffing and seizure, as well as cavitation, have caused engineers to search for improvements. For instance, if a plunger, or tappet, is misaligned within its guide bore, the outer surface of the component can become worn. Eventually, this scuffing can lead to plunger failure. In addition, in the event of a plunger seizure in a tappet assembly such as that taught in Smith, the tappet spring will be prevented from expanding, which will allow separation between valve train components and can cause major valve train and engine damage. Further, in fuel injectors using the tappet assembly design taught in Smith, the plunger is retracted by the upward movement of the tappet spring when the rocker arm moves upward and relieves the downward pressure exerted on the tappet. If fuel cannot refill the fuel pressurization chamber as quickly as the plunger retracts, the fuel passages can depressurize. This can produce cavitation bubbles which can wear away the various surfaces of the injector body and fuel passages when they collapse. Problems resulting from cavitation erosion can be a significant source of wear and failure in fuel systems.

The present invention is directed to overcoming one or more of the problems as set forth above.

SUMMARY OF THE INVENTION

In one aspect of the present invention, a plunger and tappet assembly has a body. A movable tappet assembly is mounted on the body and has a first contact surface. A plunger, which is preferably ceramic, is positioned in the body and is movable a distance and has a second contact surface that is adjacent the first contact surface.

In another aspect of the present invention, a fuel injector has an injector body that defines a fuel inlet. A pumping assembly has a free floating plunger and a movable working element that is positioned at least partially in the injector body and has a first contact surface. The free floating plunger is movable a distance and has a second contact surface that is adjacent the first contact surface. A cavity is defined at least in part by the first contact surface and the second contact surface and is substantially fluidly isolated from the fuel inlet.

In yet another aspect of the present invention, a method of pumping fluid includes providing a device that has a body defining a fluid inlet and a fluid outlet. A pumping assembly that has a free floating plunger is movable between a retracted position and an advanced position and a working element is at least partially positioned in the body and has a first contact surface. An amount of fluid is displaced through the fluid outlet by pushing the plunger toward the advanced position with the working element. The plunger is retracted by applying a fluid pressure to the plunger. The working element is retracted at least in part with a mechanical device.

DETAILED DESCRIPTION

Figure 1:
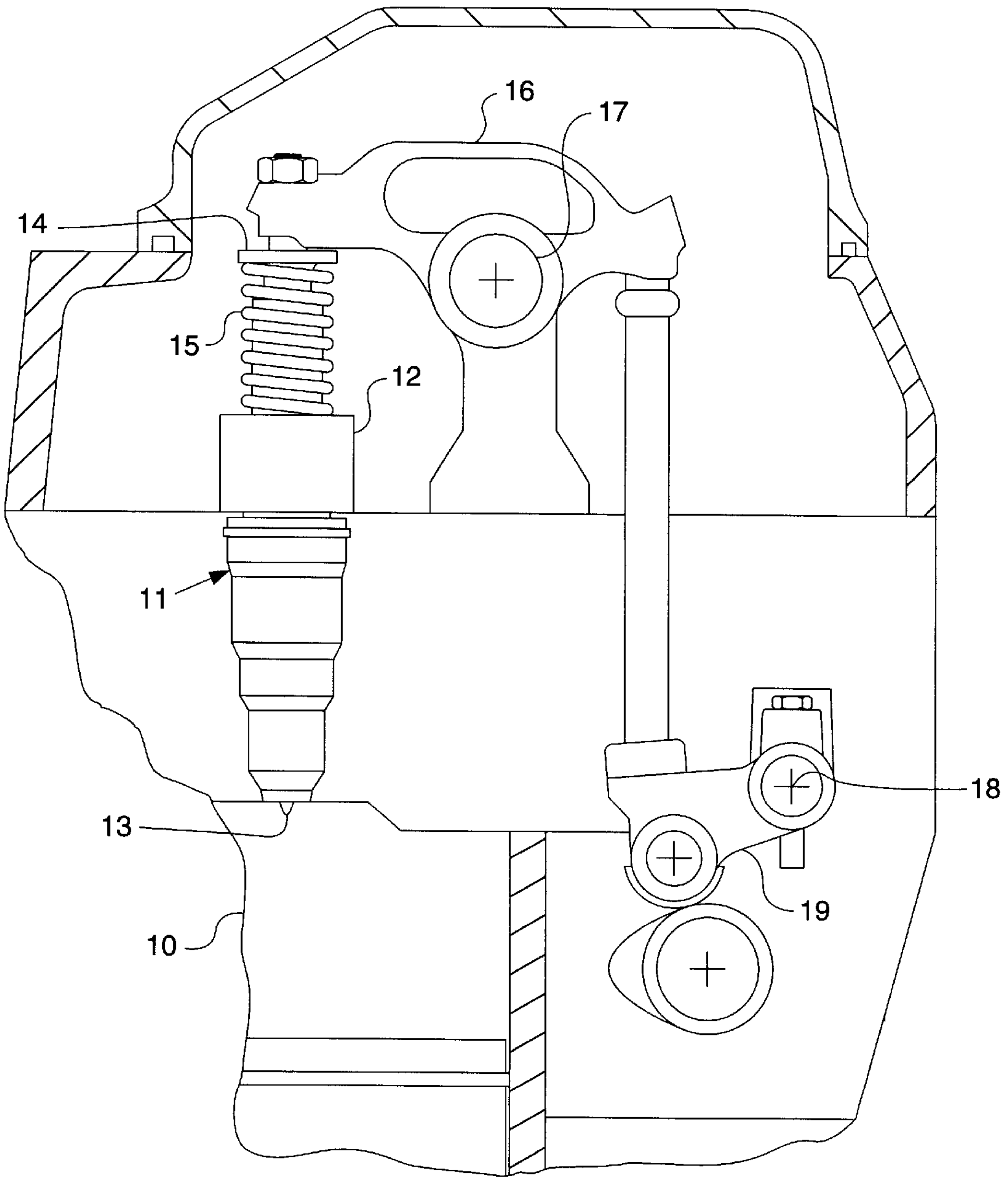
FIG. 1 is a sectioned side diagrammatic view of an engine with a fuel injector according to the present invention installed therein.

Referring now to FIG. 1, an engine 10 has a fuel injector 11 installed such that nozzle outlet 13 opens to a cylinder bore, as in a conventional diesel type engine. With each cycle of the engine, a lifter assembly 19 is moved upward about lifter group shaft 18. Lifter assembly 19 acts upon rocker arm assembly 16, which is mounted to pivot about rocker arm shaft 17. A portion of rocker arm assembly 16 is in contact with a tappet 14 that is mated to injector body 12 of fuel injector 11. A compression spring 15 has one end in contact with injector body 12 and its other end in contact with tappet 14. Compression spring 15 normally pushes tappet 14 away from injector body 12, such that rocker arm assembly 16 maintains contact with tappet 14 in a conventional manner. With each power cycle of engine 10, tappet 14 is driven downward to move a plunger within injector body 12. The downward stroke of the plunger within fuel injector 11 pressurizes fuel so that fuel commences to spray out of nozzle outlet 13.

Figure 2:
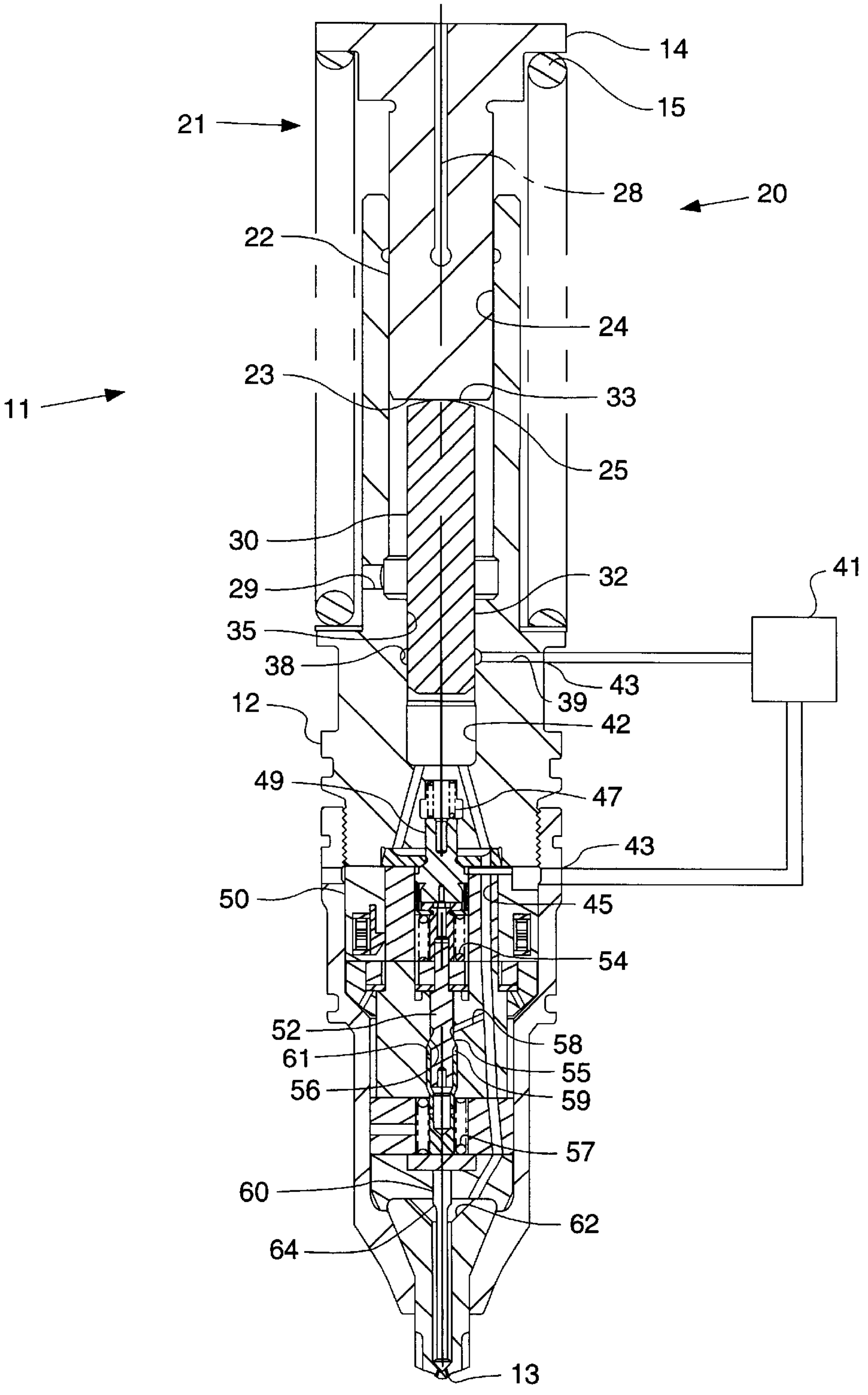
FIG. 2 is a sectioned side diagrammatic view of a mechanically actuated fuel injector according to the present invention.
Figure 3:
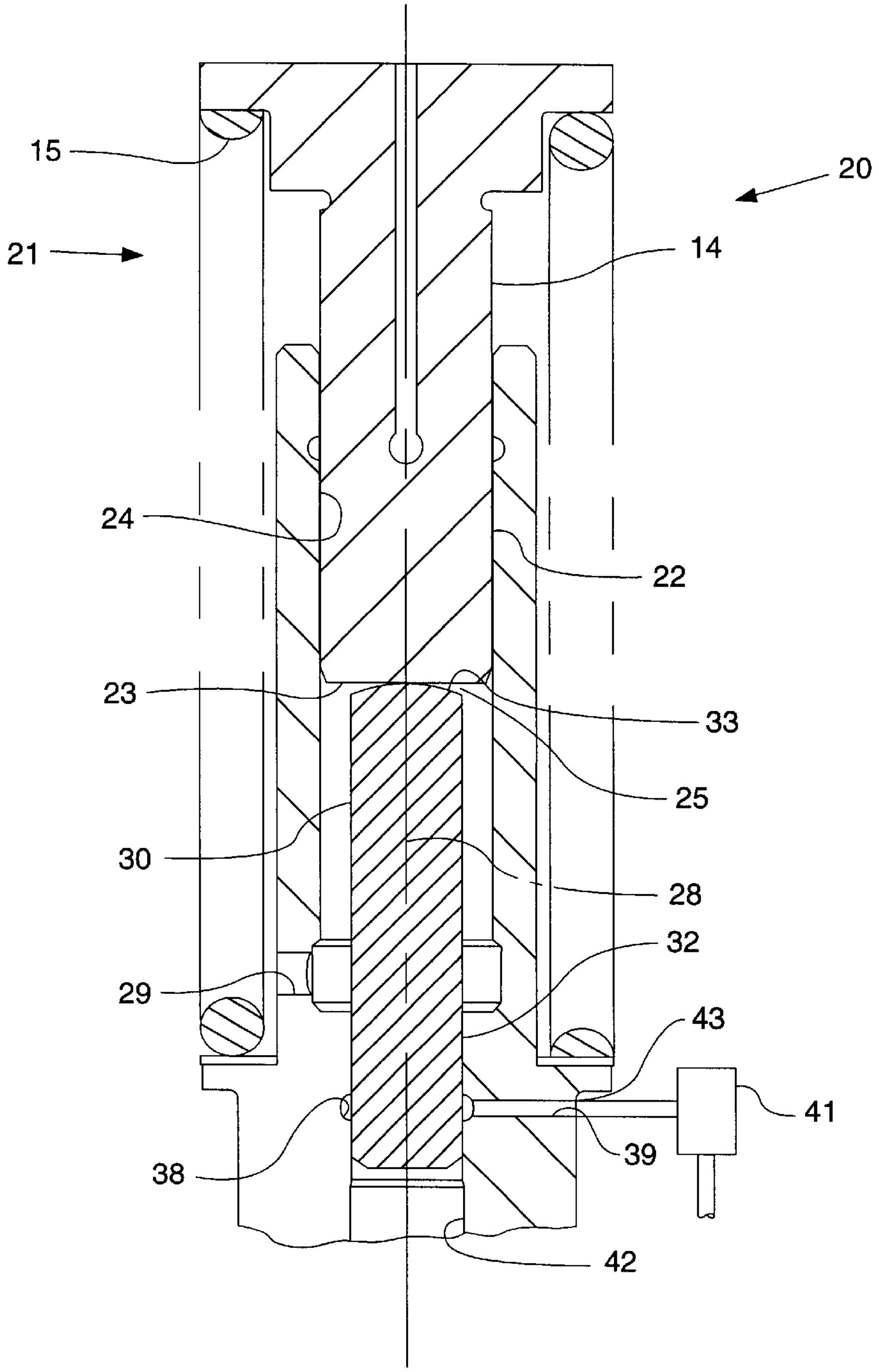
FIG. 3 is a sectioned side diagrammatic view of the tappet and plunger section of the fuel injector of FIG. 2.

Referring now to FIGS. 2 and 3 there are shown sectioned side views of fuel injector 11 and pumping assembly 21 according to the present invention. Pumping assembly 21 is preferably a tappet assembly 20 that has a working element, tappet 14, that is maintained in contact with rocker arm assembly 16. Tappet 14 is movably mounted within fuel injector 11 and has a guide surface 22 that is guided in a tappet bore 24 defined by injector body 12. Tappet 14 is movable between an upward retracted position and a downward advanced position and is biased toward its retracted position by a biasing spring 15. When rocker arm assembly 16 is in its downward position, it exerts a downward force on tappet 14 that moves tappet 14 toward its advanced position against the action of biasing spring 15. When rocker arm assembly 16 returns to its upward position, the force on tappet 14 is relieved so that the assembly returns to its retracted position under the action of biasing spring 15.

Tappet assembly 20 also has a free floating plunger 30 that is unattached to tappet 14 and positioned within fuel injector 11 to move between an advanced position and a retracted position within a plunger bore 35 that is defined by injector body 12. Plunger 30 has a guide surface 33 that allows plunger 30 to be guided within plunger bore 35. At the beginning of an injection event, when tappet 14 is moved toward its advanced position by rocker arm assembly 16, it pushes plunger 30 toward its advanced position in a corresponding manner. During this downward stroke, tappet 14 and plunger 30 act as the means to pressurize fuel within a fuel pressurization chamber 42, defined by injector body 12. Fuel pressurization chamber 42 is fluidly connected to nozzle chamber 62 via an invariable nozzle supply passage 45. In other words, nozzle supply passage 45 does not change regardless of the positioning of the moveable components within the fuel injector, including valve members and plunger 30. Plunger 30 is returned to its retracted position by fuel pressure from a fuel source 41 via a fuel inlet 43 that is defined by injector body 12. Because plunger 30 is not mechanically connected to tappet 14, plunger 30 is not moved toward its retracted position together with tappet 14 by the action of biasing spring 15. Rather, plunger 30 is moved toward its retracted position by the fuel pressure within the fuel supply lines. While the fuel supply pressure is relatively low when compared to injection pressure, it is high enough to move plunger 30 back to its retracted position.

It should be appreciated that because plunger 30 is not mechanically connected to tappet 14, but instead is a free floating plunger, some of the problems encountered by fuel injectors utilizing traditional tappet assemblies can be avoided. For instance, in tappet assemblies having a plunger that is mechanically attached to a tappet, the plunger is pulled upward by the tappet spring during the upward stroke of the tappet. Therefore, it is possible for the plunger to move toward its upward position faster than fuel can refill the fuel pressurization chamber. This can lead to depressurization of the fuel passages to cavitation levels and can result in cavitation bubbles forming within these passages. When cavitation bubbles collapse they can cause erosion of the adjacent fuel injector surfaces which can lead to serious problems within the fuel injector. However, because plunger 30 of the present invention is moved upward toward its retracted position by the pressure of fuel from source 41, instead of under the action of biasing spring 15, it can only retract as quickly as supply pressure allows. Therefore, pressure within the fuel passages will be maintained and cavitation pressure levels will not be reached. In addition to the separation of tappet 14 and plunger 30 to avoid cavitation problems, plunger 30 can also separate from tappet 14 when engine 10 is turned off. In this instance, lack of fuel pressure results in plunger 30 moving toward its advanced position due to gravity. When engine 10 is restarted, fuel supply pressure again rises, and plunger 30 is returned to its retracted position for operation. This process is facilitated by preferably making the bottom surface of plunger 30 convex in order to minimize the contact surface area. Finally, plunger 30 can also separate from tappet 14 due to dynamic forces within fuel injector 11.

Returning now to tappet assembly 20, a first contact surface 23, provided on tappet 14, is located adjacent a second contact surface 33 that is provided on plunger 30. Preferably, one of first contact surface 23 and second contact surface 33 is convex, and the other is preferably planar or concave with a radius larger than the convex surface. This will allow the contact point between these surfaces to lie along a centerline 28 of tappet 14 and plunger 30. Thus, when tappet 14 moves downward under the action of rocker arm assembly 16, the force exerted on plunger 30 will be directed along a centerline 28 of these components. When the force exerted on plunger 30 is directed along centerline 28, side forces acting on plunger 30 can be reduced, therefore minimizing the likelihood of plunger scuffing or seizure. Scuffing can occur when plunger 30 or tappet 14 rubs against its respective guide surface, causing the component to wear, and eventually, to fail. While it is preferable that first contact surface 23 and second contact surface 33 are both convex surfaces, this is not necessary. For instance, it should be appreciated that side forces could also be reduced by making only one of first contact surface 23 or second contact surface 33 a convex surface or by making both surfaces planar and orthogonal to centerline 28. In that case, the force exerted on the components would still be directed along the centerline of tappet 14 and plunger 30.

Returning now to fuel injector 11, plunger 30 preferably does not define any internal passages leading to fuel pressurization chamber 42. Therefore, when plunger 30 and tappet 14 are out of contact, a cavity 25 forms between first contact surface 23 and second contact surface 33 that is fluidly isolated from fuel inlet 43, but always open to a low pressure vent 29. This will allow plunger 30 and tappet 14 to advance and retract without any substantial influence from fluid forces in cavity 25 above second contact surface 33. However, while there are no fluid passages connecting fuel pressurization chamber 42 to cavity 25, or plunger bore 35, it should be appreciated that it is possible for fuel to migrate up past plunger 30 during its downward stroke. Therefore, the present invention preferably has a number of features to prevent the fuel that migrates into plunger bore 35 from significantly affecting the movement of plunger 30 and tappet 14 and from migrating into the engine. First, when high pressure fuel begins to travel upward in plunger bore 35, an amount of the fuel can flow into an annulus 38 that is defined by injector body 12. When fuel flows into annulus 38, its pressure drops, and it can flow out of fuel injector 11 via a vent passage 39 that is defined by injector body 12. However, because the pressure of fuel within fuel pressurization chamber 42 and plunger bore 35 is extremely high, a portion of the fuel will not flow into annulus 38, but will continue to migrate upward around plunger 30. Plunger bore 35 has a constant diametrical clearance because plunger 30 is cylindrical, and therefore, symmetrical. It should be appreciated that the longer the distance that fuel must travel upward with a constant diametrical clearance, the lower amount of fuel that would leak out of the injector tappet assembly. Therefore, the distance that plunger 30 is guided within a constant diametrical bore above the annulus is approximately doubled as compared to previous fuel injectors. This feature can prevent fuel from interfering with the movement of plunger 30 and tappet 14 in an undesirable manner, and also from leaking out of the injector and mixing with engine oil.

While most of the components of engine 10 and fuel injector 11 are preferably composed of traditional materials, plunger 30 is preferably machined from a non-metallic material, such as a ceramic material. As illustrated, plunger 30 is preferably a cylindrical, homogeneous component that does not define any internal passages or sharp edges. Therefore, a ceramic or other non-metallic material that is weakened by these types of features can be successfully used for this component. In addition, ceramic materials are preferable for this application because they have a higher resistance to scuffing and seizing than do other plunger materials, such as steel. Ceramic plungers are believed to have better resistance to these undesirable phenomena due to the hard smooth outer surface of the component. In addition, ceramics also tend to have a higher resistance to distortion than do their steel or metallic counterparts.

During an injection event, when plunger 30 is undergoing the downward stroke toward its advanced position, the pressure forces exerted on its top and bottom surfaces from tappet 14 and the high fuel pressure within fuel pressurization chamber 42 can cause the component to distort in shape and become shorter and wider. This leads to a decrease in the clearance between plunger 30 and plunger bore 35, the result of which is an increase in scuffing or wear on the outer surface of plunger 30. However, plungers machined from ceramics do not tend to distort as much as those machined from more traditional metallic materials. Therefore, if plunger 30 is machined from a ceramic material, it will become less short and wide during the downward stroke as it otherwise would if it were composed of a metallic material. This can reduce plunger wear due to distortion because the clearance between plunger 30 and plunger bore 35 will not become as tight. This phenomenon can also permit the clearance between the plunger outside diameter and the guide bore inside diameter to be reduced. While it is preferable that plunger 30 is machined from a ceramic material, it should be appreciated that plunger 30 could be composed of a more traditional material, such as steel.

Returning now to fuel injector 11, a direct control needle valve member 60 is movably positioned in injector body 12 and has an opening hydraulic surface 64 exposed to fluid pressure in a nozzle chamber 62 and a closing hydraulic surface 61 exposed to fluid pressure in needle control chamber 59. Needle valve member 60 is movable between an upward, open position and a downward, closed position and is biased toward its downward position by a biasing spring 57. Pressure within needle control chamber 59 is controlled by the position of a needle control valve member 52. Needle control valve member 52 is normally biased downward by a needle control biasing spring 54 and a spill biasing spring 47. When needle control valve member 52 is in this position, a valve surface 55 is out of contact with a valve seat 56 to open needle control chamber 59 to fluid communication with nozzle supply passage 45 via a pressure communication passage 58. When needle control valve member 52 is in its upward position, valve seat 56 is closed by valve surface 55 and pressure within needle control chamber 59 becomes relatively low. Opening hydraulic surface 64 and closing hydraulic surface 61 are preferably sized such that a valve opening pressure can be reached in nozzle chamber 62 when needle control chamber 59 is blocked from nozzle supply passage 45.

Needle control valve member 52 and a spill control valve member 49 are both operably coupled to a solenoid 50. While the relative positioning of needle control valve member 52 controls pressure within needle control chamber 59, pressure within fuel pressurization chamber 42 is affected by the position of spill control valve member 49. Spill control valve member 49 is biased toward its downward position by spill biasing spring 47. When spill control valve member 49 is in its downward position, fuel within fuel pressurization chamber 42 can flow back into fuel inlet 43 through a spill passage defined by injector body 12. When solenoid 50 is energized to a first position, needle control valve member 52 moves upward, but does not advance enough for valve surface 55 to close valve seat 56. Spill control valve member 49 is moved to its upward position to block fuel pressurization chamber 42 from the spill passage. Pressure within fuel pressurization chamber 42 can now increase to injection levels. When solenoid 50 is energized to a second position, needle control valve member 52 is raised to its upward position to allow valve surface 55 to close valve seat 56. Needle control chamber 59 is now fluidly blocked from pressure communication passage 58 and pressure acting on closing hydraulic surface 61 can quickly drop due to a vent clearance and vent passage defined by injector body 12.

Figure 4:
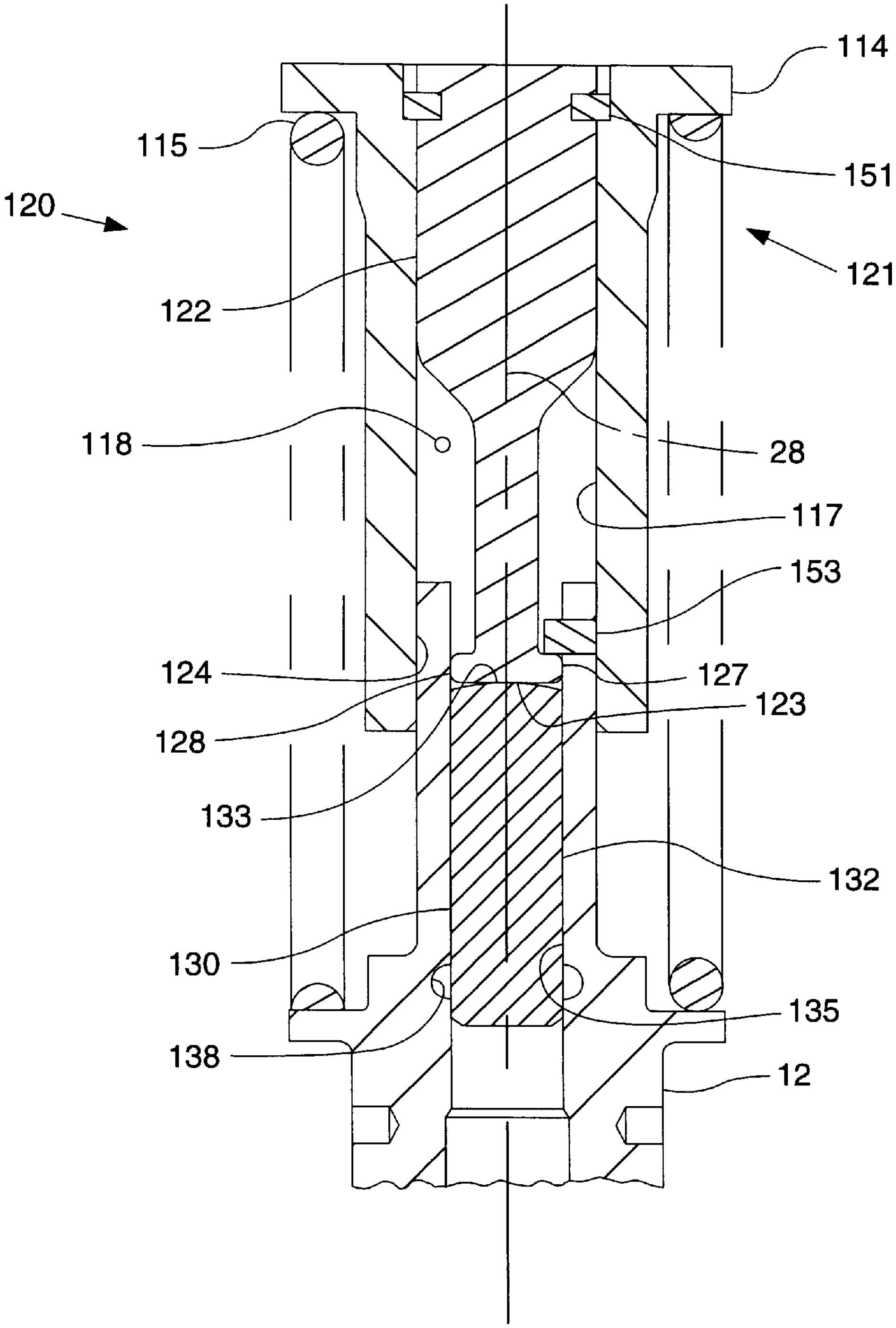
FIG. 4 is a sectioned side diagrammatic view of an alternate embodiment of the tappet and plunger section for use with the fuel injector of FIG. 2.

Referring now to FIG. 4 there is shown an alternate embodiment of pumping assembly 21 for use with fuel injector 11. With minor modifications, the pumping assembly illustrated in FIG. 4 could be substituted into fuel injector 11 to make a complete injector. Once again, pumping assembly 121 is preferably a tappet assembly 120 that has a tappet 114 and a free floating plunger 130. Tappet assembly 120 also has a pushrod 122 that is attached to tappet 114 by a retaining clip 151. Pushrod 122 has a first contact surface 123 that is adjacent a second contact surface 133 of plunger 130. Once again, while it is preferable that one of first contact surface 123 and second contact surface 133 be convex, to reduce the likelihood of side forces acting on pushrod 122 and plunger 130, the desired effect could be achieved if the other were preferably concave.

Pushrod 122 has an enlarged portion 127 that moves within plunger guide bore 135. In other words, unlike the tappet assembly 20 illustrated previously that had a tappet 14 and a plunger 30 that were guided in a series, tappet 114 and plunger 130 are guided in a parallel manner. In other words, a guide surface 124 of tappet 114 is guided along the outside of injector body 12 while a guide surface 132 of plunger 130 is guided within plunger bore 135, defined by injector body 12. This parallel guiding allows less vertical space for tappet assembly 120 which in turn allows more design space for components in the lower portion of fuel injector 11. In addition, enlarged portion 127 defines a side surface 128 that maintains a close diametrical clearance with plunger bore 135, but is preferably rounded. When side surface 128 is shaped as such, plunger bore 135 can be fluidly connected to a cavity 117 defined by tappet 114 to allow any air trapped therein to be vented through vent passage 118. This feature will allow the movement of plunger 130, tappet 114 and pushrod 122 from being affected by air trapped within cavity 117. While side surface 128 need not be shaped as such, this feature can reduce scuffing and potential seizure problems. Another difference between tappet assembly 120 and the tappet assembly 20 of the previous embodiment is the use of a retaining pin 153, as illustrated in FIG. 4. Retaining pin 153 is preferably a cylindrical pin, but could be a retention ball or other suitable retaining member. Use of a cylindrical pin as retaining pin 153 is preferred because retention surfaces for retaining pin 153 can then be perpendicular to centerline 28 which can reduce, or even eliminate, undesirable side forces exerted on tappet assembly 120 from the retention member. Retaining pin 153 can limit the upward movement of pushrod 122, and therefore will help to maintain tappet 114, pushrod 122 and tappet spring 115 during shipping.

As with the FIGS. 2 and 3 embodiment, free floating plunger 130 is not mechanically attached to pushrod 122. Therefore, plunger 130 is able to uncouple from pushrod 122 over a portion of its movement. Recall from discussion of the previous embodiment that this feature can lower the risk of cavitation erosion damage to the fuel injector. In addition, plunger 130 can move independently of pushrod 122 as a result of engine shutdown and dynamic forces within fuel injector 11. As with plunger 30, plunger 130 preferably does not define any internal passageways or sharp edges and is preferably machined from a non-metallic material, such as a ceramic material, that has a higher resistance to scuffing, seizure and distortion than do more traditional, metallic materials. Note that injector body 112 also defines an annulus 138 that can allow fuel that has migrated into plunger bore 135 to flow into a fuel drain to reduce the risk of fuel leakage into the engine.

INDUSTRIAL APPLICABILITY

Referring now to FIGS. 1–3, just prior to an injection event, lifter arm assembly 19 is in its downward position such that rocker arm assembly 16 is in an upward position exerting a minimum amount of force on tappet 14. Tappet 14 and plunger 30 are in their upward positions, piston 55 is in its downward position and needle valve member 60 is in its closed position blocking nozzle outlet 13 from nozzle supply passage 45. Spill control valve member 49 is in its downward position opening fuel pressurization chamber 42 to the spill passage and needle control valve member 52 is in its downward position opening pressure communication passage 58 to needle control chamber 59. The injection event is initiated when lifter assembly 19 moves upward about lifter group shaft 18. Lifter assembly 19 then acts upon rocker arm assembly 16, and pivots the same downward about rocker arm shaft 17. When rocker arm assembly 16 begins to pivot, it exerts a downward force on tappet 14 which is moved toward its advanced position against the action of biasing spring 15.

When tappet 14 begins to move downward toward its advanced position, first contact surface 23 exerts a downward force on second contact surface 33, and plunger 30 begins to move toward its advanced position in a corresponding manner. Solenoid 50 is then activated to its first, low current position and spill control valve member 49 is moved to its upward position in which fuel pressurization chamber 42 is blocked from the spill passage. Recall that needle control valve member 52 also moves upward at this time, however, it does not move up far enough for pressure communication passage 58 to be blocked from needle control chamber 59. As plunger 30 moves downward, it pressurizes the fuel within fuel pressurization chamber 42, piston control passage 50 and nozzle supply passage 45. Just prior to the desired time for fuel injection, solenoid 50 is activated to its second, higher current position and needle control valve member 52 is moved to its upward position to allow valve surface 55 to close valve seat 56, blocking needle control chamber 59 from the high pressure fuel in nozzle supply passage 45. Pressure acting on opening hydraulic surface 64 within nozzle chamber 62 continues to rise as plunger 30 advances. When the pressure exerted on opening hydraulic surface 64 exceeds a valve opening pressure, needle valve member 60 is lifted to its upward position to open nozzle outlet 13. High pressure fuel within nozzle supply passage 45 can now spray into the combustion chamber.

Just prior to the end of an injection event, while tappet 14 and plunger 30 are still moving toward their downward positions, current to solenoid 50 is terminated. This allows needle control valve member 52 to return to its biased, downward position, and needle control chamber 59 is again opened to pressure communication passage 58. High pressure fuel flowing into needle control chamber 59 now acts on closing hydraulic surface 61 to push needle valve member 60 to its downward position closing nozzle outlet 13 from nozzle supply passage 45 and ending fuel spray into the combustion space. At about the same time, spill valve member 49 moves to its biased position to open fuel pressurization chamber 42 to the spill passage to allow fuel pressure within fuel pressurization chamber 42 and nozzle supply passage 45 to be vented.

Once the injection event is ended, various components of fuel injector 11 can be reset in preparation for the next injection event. Having reached its upward position after fuel spray into the combustion space ended, lifter arm assembly 19 begins to move toward its downward position about lifter group shaft 18. This results in an upward movement of rocker arm assembly 16 about rocker shaft 17. As rocker arm assembly 16 moves upward, tappet 14 moves upward in a corresponding manner. Pressure acting on second contact surface 33 is then relieved and plunger 30 moves upward toward its advanced position due to the relatively low, but sufficient fuel supply pressure acting on the bottom of plunger 30. Because tappet 14 and plunger 30 are not mechanically connected, these components can move uncoupled. Therefore, plunger 30 can move upward under the fuel supply pressure, rather than being pulled upward by biasing spring 15. Recall that this feature can reduce the risk of cavitation. In addition, because plunger 30 is capable of uncoupling from tappet 14, the risk of collateral engine damage in the event of a plunger seizure can be reduced because tappet 14 can still return to its retracted position, preventing biasing spring 15 from separating from the rocker arm.

Referring now to FIG. 4, when rocker arm assembly 16 exerts a downward force on tappet 114, both tappet 114 and pushrod 122 begin to move toward their advanced positions. Pushrod 122 then exerts a downward force on plunger 130, causing the same to move toward its advanced position. The downward movement of plunger 130 will act to pressurize fuel in fuel pressurization chamber 142 and the injection event will progress in the same manner as that described for the FIGS. 2 and 3 embodiment. Just prior to the end of an injection event, when rocker arm assembly 16 begins to rotate toward its upward position, pressure is relieved on tappet 114 and pushrod 122, and these components can return to their retracted positions under the action of biasing spring 115. As with plunger 30, plunger 130 is returned to its retracted position, not by the action of biasing spring 115, but by the fuel supply pressure acting on the its bottom surface. As plunger 130 returns to its retracted position, any fuel that has become trapped in cavity 117 is forced out of plunger bore 135 by vent passage 118.

The tappet assembly of the present invention has a number of advantages over conventional assemblies. Because the contact point between tappet 14 and plunger 30 is preferably along the centerline of these components, side forces exerted on plunger 30 are reduced. This in turn can reduce the bending moment of the plunger, which is a contributing factor for plunger scuffing or seizure. In addition, because the plunger is preferably composed of a non-metallic material, such as a ceramic material, the risk of seizure and scuffing can be further reduced. This is because the hard, smooth surface of the ceramic plunger is believed to lessen the likelihood of these occurrences.

The present invention also preferably utilizes a ceramic plunger in part because ceramics have excellent distortion resistance. Recall that when the plunger is moving toward its advanced position, the high fuel pressure below the plunger can cause the shape of the plunger to distort, or become shorter and wider, which will reduce the clearance between the plunger and the plunger bore and can increase scuffing and seizure problems. However, ceramic plungers undergo less distortion than plungers made from other materials, such as steel. Therefore the clearance between the plunger and the plunger bore does not vary as much, resulting in less of a contribution to scuffing or seizure problems. Additionally, because the plunger of the present invention is not attached to the tappet, the risk of collateral engine damage due to plunger seizures is reduced. While the risk of plunger seizures is reduced by the present invention, if a plunger seizure should occur, the tappet spring will not separate from the rocker arm assembly, as it can in engines using traditional tappet assemblies having a tappet and plunger mechanically attached. Instead, if there is a plunger seizure, the tappet can continue its upward movement and allow the tappet spring to expand. Further, because the plunger of the present invention is preferably cylindrical, the geometry of the tappet assembly of the present invention has been simplified from that of previous tappet assemblies, thereby making manufacturing easier because of the simplicity of the plunger design.

The present invention can also reduce the amount of fuel that can leak out of the injector, possibly on to the engine. Recall that while the plunger is moving toward its advanced position, high pressure fuel from the fuel pressurization chamber can migrate upward around the plunger. While some fuel travels into the injector body annulus, where its pressure can drop and it can then flow back to the fuel pressurization chamber, an amount of the fuel continues to migrate upward around the plunger. However, because the plunger and plunger bore of the FIG. 4 embodiment of the present invention provide a longer sealing length, having a constant diametrical clearance, than previous fuel injectors, the amount of fuel traveling far enough upward to enter the engine is reduced. Further, because the plunger is preferably machined from a ceramic material, it will undergo less distortion than plungers made from traditional materials, thus allowing a reduced clearance between the plunger and the plunger bore. In addition, the present invention could be useful in other applications such as fluid pumps, including unit pumps, swash plate pumps and radial pumps.

The retaining pin and retaining clip of the present invention find potential applicability in any tappet driven fuel injector, especially those that face the possibility of becoming disconnected during shipping and handling prior to installation. The retention means of the present invention is especially applicable for use in those cases where space and structural constraints limit available space for external clamps and the like. In addition, the retaining pin of the present invention can reduce side forces experienced by the tappet assembly during transport. When the invention is assembled it cannot come apart, and the means by which this is accomplished does not affect increase injector height. The pin is preferably located to hold the injector just beyond its power installation maximum extension length. This better enables installation without special tools.

It should be understood that the above description is intended for illustrative purposes only, and is not intended to limit the scope of the present invention in any way. For instance, while the present invention has been illustrated for a mechanically actuated fuel injector, it should be appreciated that it could find application in hydraulically actuated fuel injectors as well. In that case, the plunger would be capable of moving uncoupled from the intensifier piston for a portion of its movement. Further, while the plunger of the present invention is preferably machined from a ceramic material, it could be machined from other non-metallic materials or instead from traditional materials, such as steel. Additionally, while one of the contact surfaces of the plunger and tappet are preferably convex, it should be appreciated that the tappet assembly of the present invention could perform adequately if neither or them were convex. Thus, those skilled in the art will appreciate that other aspects and features of the present invention can be obtained from a study of the drawings, the disclosure, and the appended claims.

What is claimed is:

1. A fuel injector comprising:

an injector body defining a fuel inlet and a nozzle chamber;

a pumping assembly including a free floating plunger and a movable working element being positioned at least partially in said injector body and having a first contact surface;

said free floating plunger being movable a distance and having a second contact surface adjacent said first contact surface;

a cavity defined at least in part by said first contact surface and said second contact surface being substantially fluidly isolated from said fuel inlet; and said injector body and said plunger defining a fuel pressurization chamber fluidly connected to said nozzle chamber via an invariable nozzle supply passage.

2. The fuel injector of claim 1 wherein one of said first contact surface and said second contact surface is convex.

3. The fuel injector of claim 2 wherein said plunger is homogeneous and cylindrical.

4. The fuel injector of claim 3 wherein said working element includes a tappet.

5. The fuel injector of claim 4 wherein said cavity is fluidly connected to a vent defined at least in part by said injector body.

6. The fuel injector of claim 5 wherein said plunger is composed of a ceramic material.

7. The fuel injector of claim 6 wherein said working element includes a movable pushrod that is attached to said tappet by a retaining clip; and said pushrod is limited in its movement by a retaining pin.

8. A method of pumping fluid comprising:

providing a device having a body defining a low pressure fluid inlet and a high pressure fluid outlet, and including a pumping assembly that includes a free floating plunger that is movable between a retracted position and an advanced position to displace fluid from a pressurization chamber partially defined by said plunger, and a working element that is at least partially positioned in said body and includes a first contact surface;

displacing an amount of fluid from said pressurization chamber and through said high pressure outlet via an invariable nozzle supply passage by pushing said plunger toward said advanced position with said working element;

retracting said plunger by applying a fluid pressure to said plunger; and retracting said working element at least in part with a mechanical device.

9. The method of claim 8 including a step of moving said first contact surface out of contact with a second contact surface included on said plunger during said steps of retracting said plunger and retracting said working element.

10. The method of claim 8 wherein said step of displacing an amount of fluid is accomplished by mechanically driving said working element downward.

11. The method of claim 8 wherein said working element is a tappet; and including a step of aligning a centerline of said tappet with a centerline of said plunger at least in part by including a convex surface on one of said first contact surface and a second contact surface included on said plunger.

12. The method of claim 8 including a step of venting a cavity between said first contact surface and a second contact surface included on said plunger.

13. The method of claim 8 wherein said working element is a tappet; and said step of retracting said tappet includes mechanically retracting said tappet, at least in part by operably coupling said tappet to a biasing spring.

* * * * *